United States Patent
Wakabayashi et al.

(10) Patent No.: US 6,674,931 B2
(45) Date of Patent: Jan. 6, 2004

(54) ADAPTIVE DISPERSION COMPENSATION DEVICE AND CONTROL METHOD FOR THE SAME

(75) Inventors: Shinichi Wakabayashi, Sagamihara (JP); Kensuke Ogawa, Hachioji (JP); Akira Suzuki, Kashiwa (JP)

(73) Assignees: Matsushita Electric Industrial Co., Ltd., Osaka (JP); Hitachi, Ltd., Tokyo (JP); NEC Corporation, Tokyo (JP)

( * ) Notice: Subject to any disclaimer, the term of this patent is extended or adjusted under 35 U.S.C. 154(b) by 0 days.

(21) Appl. No.: 10/252,844

(22) Filed: Sep. 24, 2002

(65) Prior Publication Data

US 2003/0138197 A1 Jul. 24, 2003

(30) Foreign Application Priority Data

Sep. 26, 2001 (JP) .................................. 2001-294755

(51) Int. Cl.[7] .................................................. G02B 6/26
(52) U.S. Cl. .............................. 385/15; 385/37; 385/10; 385/31
(58) Field of Search .............................. 385/15, 37, 24, 385/123, 136, 10

(56) References Cited

U.S. PATENT DOCUMENTS

| | | | |
|---|---|---|---|
| 6,275,629 B1 * | 8/2001 | Eggleton et al. | 385/37 |
| 6,400,869 B2 * | 6/2002 | Pan et al. | 385/37 |
| 6,515,778 B1 * | 2/2003 | Epworth et al. | 385/37 |

FOREIGN PATENT DOCUMENTS

| | | |
|---|---|---|
| JP | 2000-137197 | 5/2000 |
| JP | 2000-235170 | 8/2000 |

OTHER PUBLICATIONS

Ogawa et al. "High–Sensitivity Pulse Spectrogram Measurement using Two–Photon Absorption in a Semiconductor at 1.5 $\mu$m Wavelength" Optics Express vol. 7, No. 3 (Jul. 31, 2000) 135–140.

* cited by examiner

Primary Examiner—Phan T. H. Palmer
(74) Attorney, Agent, or Firm—Browdy and Neimark, P.L.L.C.

(57) ABSTRACT

An adaptive dispersion compensation device offered performs stably the dispersion compensation, inclusive of waveform shaping, for an optical fiber transmission line. The device comprises a plurality of basic units each including a chirp-bragg fiber grating which is formed in an optical waveguide, a reflection mirror which is disposed on the light input side of the chirp-bragg fiber grating by being detachable and an optical circulator which is connected to the reflection mirror, means of connecting the basic units in series, and means of controlling the dispersion characteristics of each chirp-bragg fiber grating by applying a temperature gradient to it along its axis. The individual chirp-bragg fiber gratings with the application of temperature gradients vary the dispersion quality of the lights passing through the basic units, thereby controlling the dispersion quality of the input signal light stably and releasing the compensated signal light.

5 Claims, 8 Drawing Sheets

Fig. 6
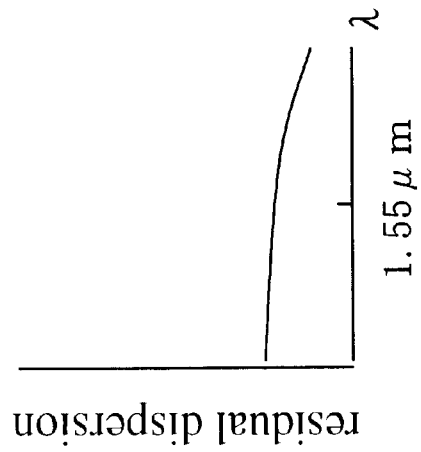
(b) residual dispersion value at the light output of transmission line
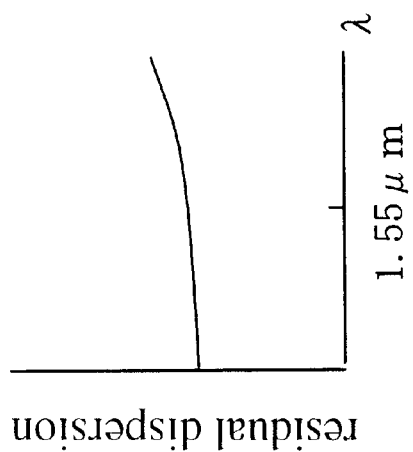
(a) residual dispersion value at the light input of transmission line

Fig. 7
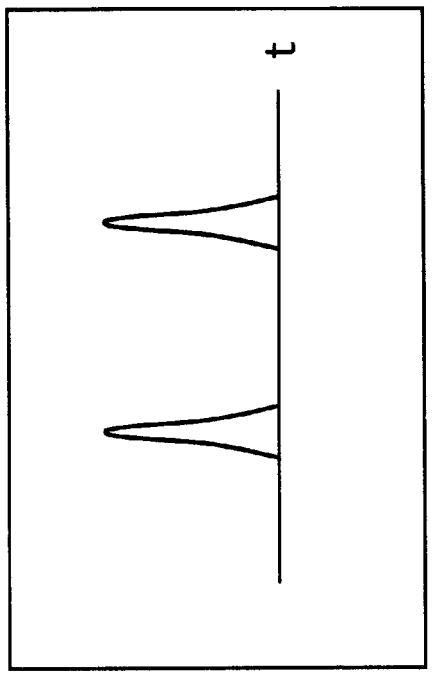
(a)
pulse width of input light
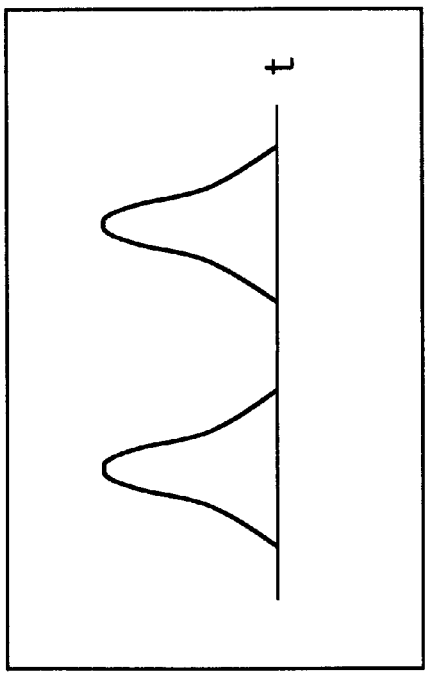
(b)
pulse width of output light

ADAPTIVE DISPERSION COMPENSATION DEVICE AND CONTROL METHOD FOR THE SAME

BACKGROUND OF THE INVENTION

1. Field of the Invention

The present invention relates to a method of chromatic dispersion compensation which includes the function of pulse waveform shaping, and particularly to an adaptive dispersion compensation device and a control method for the device which are useful for the super-high speed optical fiber communication.

2. Description of the Prior Art

The optical fiber communication which has innovated on the trunk system is advancing toward the subscriber system in recent years.

In practicing the long-distance or high-speed transmission of optical signals having wavelengths of 1.5-$\mu$m band through a 1.3-$\mu$m band zero-dispersion optical fiber cable which is most prevalent currently, it is necessary for the prevention of decay of optical signals to provide a means of dispersion control against the chromatic dispersion of around 17 ps/km·nm that is inherent in optical fiber.

The conventional dispersion control means is typically a dispersion compensator which is based on a chirp-bragg fiber grating having a structure of continuously varied reflectivity modulation periods. The chirp-bragg fiber grating which forms a diffraction grating within the core of optical fiber cable has a property of light reflection of a specific wavelength. By forming a diffraction grating (chirp-bragg fiber grating) which varies the pitch continuously along the axis of optical fiber, it becomes a device of having a reflection position which depends on the wavelength of light.

By utilizing this property of chirp-bragg fiber grating, a dispersion compensator is built. The chirp-bragg fiber grating, when combined with an optical circulator, is equivalent in function to a dispersion compensation fiber, while being compact. While the conventional chirp-bragg fiber gratings have static characteristics of dispersion and reflection in most cases, it is desirable for many applications such as dispersion compensation to have diffraction gratings which are controllable in terms of band or dispersion.

A prior art example which attempted to introduce a dynamically adjustable chirp to a chirp-bragg fiber grating appeared as "optical diffraction grating device having adjustable chirp" in Japanese Patent Unexamined Publication No.2000-137197.

FIG. 1 shows the fabrication process of this chirp diffraction grating, which includes: A. preparation of an optical waveguide inclusive of a diffraction grating, B. coating of the diffraction grating region with a variable resistance thin film, and C. packaging of device.

The first step A prepares an optical waveguide of a certain length which includes a diffraction grating. The waveguide is optical fiber which is not coated preferably or may include an electrically insulated resistance thin film of uniform resistance. The waveguide can be of either single mode or multi-mode. The diffraction grating can be either a bragg diffraction grating or a long-period diffraction grating. The second step B coats the waveguide with such a thin film of resistance material that the local resistance increases continuously along the axis of diffraction grating. The third step C, which is implemented only when necessary, encases the device in a package.

FIG. 2 is a brief cross-sectional diagram, showing a specific example of the structure of waveguide diffraction grating device having an adjustable chirp. Indicated by 10 is optical fiber, 11 is a diffraction grating, 12 is the perturbation of refraction, 13 is a base body, and 14 and 15 are electrodes.

The optical waveguide diffraction grating of adjustable chirp includes a waveguide diffraction grating which is thermally in contact with a thermal conversion base body which varies in temperature along the axis of diffraction grating and is controllable electrically. The thermal conversion base body, which creates a temperature gradient along the diffraction grating, is capable of generating or absorbing heat on the fiber. In one example, the thermal conversion base body is a resistance coat film which varies in local resistance along the axis of diffraction grating. A current flowing in the thin film produces a temperature gradient which is virtually proportional to the local resistance of thin film, and the magnitude of chirp can be adjusted based on the value of current. This device is simple, compact and high in power efficiency.

A femto-second optical scope which is a means of detecting the nature of a signal light in optical fiber transmission is described in an article entitled "High-resistivity pulse spectrogram measurement using two-photon absorption in a semiconductor at 1.5-$\mu$m wavelength" in publication OPTICS EXPRESS, Vol.7, No.3 (published on Jul. 31, 2000), pp.135–140. The femto-second optical scope is designed inherently to make a two-dimensional map between the wavelength and the delay time based on the measurement of the time dependency and wavelength dependency of the phase of a super-high speed light pulse of the order of femto seconds, and it is capable of computing the second, third and fourth-order dispersion values of the optical transmission line based on the implementation of curve fitting.

However, in regard to the above-mentioned means with the chirp-bragg fiber grating, the manner of light detection for the compensation of dispersion in response to the variation of transmission state and transmission distance and the manner of feedback control of the dispersion characteristics based on the light detection are not described, and this means is problematic in that it cannot deal flexibly with the actual super-high speed light pulse transmission. Furthermore, the resistance member, which is designed to create a temperature gradient based on the control of the amount of heat generation by varying the resistance value in accordance with the progressive variation of thin film thickness, is problematic in that it is difficult to control the high-order (third order and above) dispersion which is higher than the chromatic dispersion (second order dispersion).

SUMMARY OF THE INVENTION

With the intention of solving the foregoing prior art problems, it is an object of the present invention to provide an adaptive dispersion compensation device which performs the dispersion compensation inclusive of waveform shaping in adaptive fashion for the optical fiber transmission.

Another object of the present invention is to provide a control method for the adaptive dispersion compensation device.

In order to achieve the above objectives, the present invention resides in an adaptive dispersion compensation device which is arranged to include a plurality of basic units each including a chirp-bragg fiber grating which is formed in an optical waveguide, a reflection mirror which is disposed on the light input side of the chirp-bragg fiber grating by being detachable and an optical circulator which is connected to the reflection mirror, means of connecting the basic units in series, and means of controlling the dispersion characteristics of each chirp-bragg fiber grating by applying a temperature gradient to it along its axis.

In case there is no reflection mirror placed in the basic unit, the optical circulator is connected to the chirp-bragg fiber grating by an optical fiber with optical connectors so that the input light is put directly into the grating. In case a reflection mirror is placed in the basic unit, the entire input light can be reflected by it or part of the input light can be conducted by it to reach the chirp-bragg fiber grating, with the rest being reflected, depending on its reflectivity.

The basic units have individual dispersion characteristics combined to make the dispersion characteristics of the whole device, thereby performing the dispersion compensation or waveform shaping in adaptive fashion for the optical fiber transmission.

The inventive adaptive dispersion compensation device is also arranged to include a femto-second optical scope which detects the nature of the output signal light and means of controlling the dispersion characteristics of each basic unit in feedback fashion based on the dispersion value computed from the detected nature of the output signal light. By the detection of a super-high speed light pulse of the order of femto seconds and the dispersion control based on the pulse detection, adaptive control can readily be performed.

The inventive adaptive dispersion compensation device is also arranged to include means of controlling the dispersion characteristics of each chirp-bragg fiber grating by applying a tension to it along its axis.

The inventive adaptive dispersion compensation device is also arranged to include means of controlling the dispersion characteristics of each basic unit in feedback fashion based on the dispersion value of the third or higher order computed from the nature of the output signal light.

The present invention also resides in a method of controlling an adaptive dispersion compensation device which includes the operational steps of entering a control signal for setting a temperature gradient of each chirp-bragg fiber grating to a dispersion characteristics control means, applying the temperature gradient, which is produced by the dispersion characteristics control means in accordance with the control signal, to each chirp-bragg fiber grating along its axis, and controlling the dispersion quality of the input light with the chirp-bragg fiber gratings having the application of the temperature gradients.

As described above, the inventive adaptive dispersion compensation device is capable of performing the dispersion compensation inclusive of waveform shaping in adaptive fashion for the optical fiber transmission, and it is compact and stable in operation. The inventive adaptive dispersion compensation device and its control method are capable of performing the dispersion compensation inclusive of waveform shaping in adaptive fashion for the optical fiber transmission while monitoring the light signal on the optical fiber transmission line.

These and other objects and advantages of the present invention will become more apparent from the following description taken in conjunction with the accompanying drawings.

BRIEF DESCRIPTION OF THE DRAWINGS

FIG. 6 is a set of graphs of this embodiment, showing the residual dispersion values at the light input position and light output position of the transmission line;

FIG. 7 is a set of characteristic graphs of this embodiment, showing the pulse widths of the input light and output light.

DESCRIPTION OF THE PREFERRED EMBODIMENTS

Figure 1:
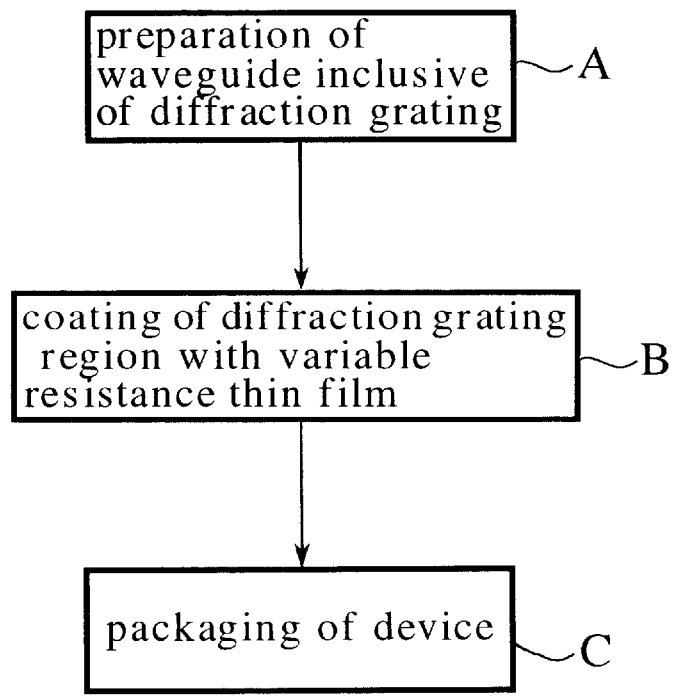
FIG. 1 is a flowchart showing the fabrication steps of the chirp diffraction grating of the conventional adaptive dispersion compensation device.
Figure 2:
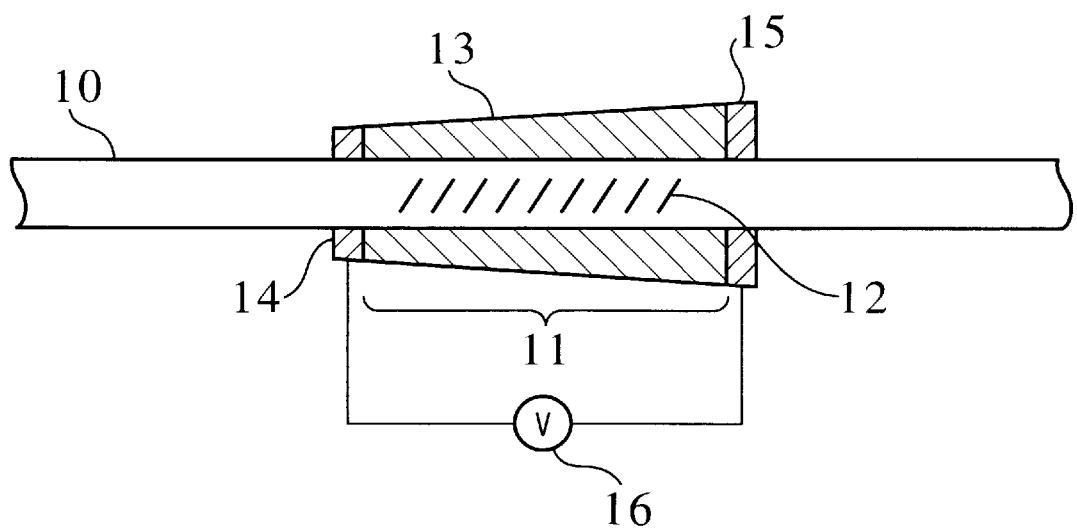
FIG. 2 is a brief cross-sectional diagram showing the structure of the conventional adaptive dispersion compensation device.
Figure 3:
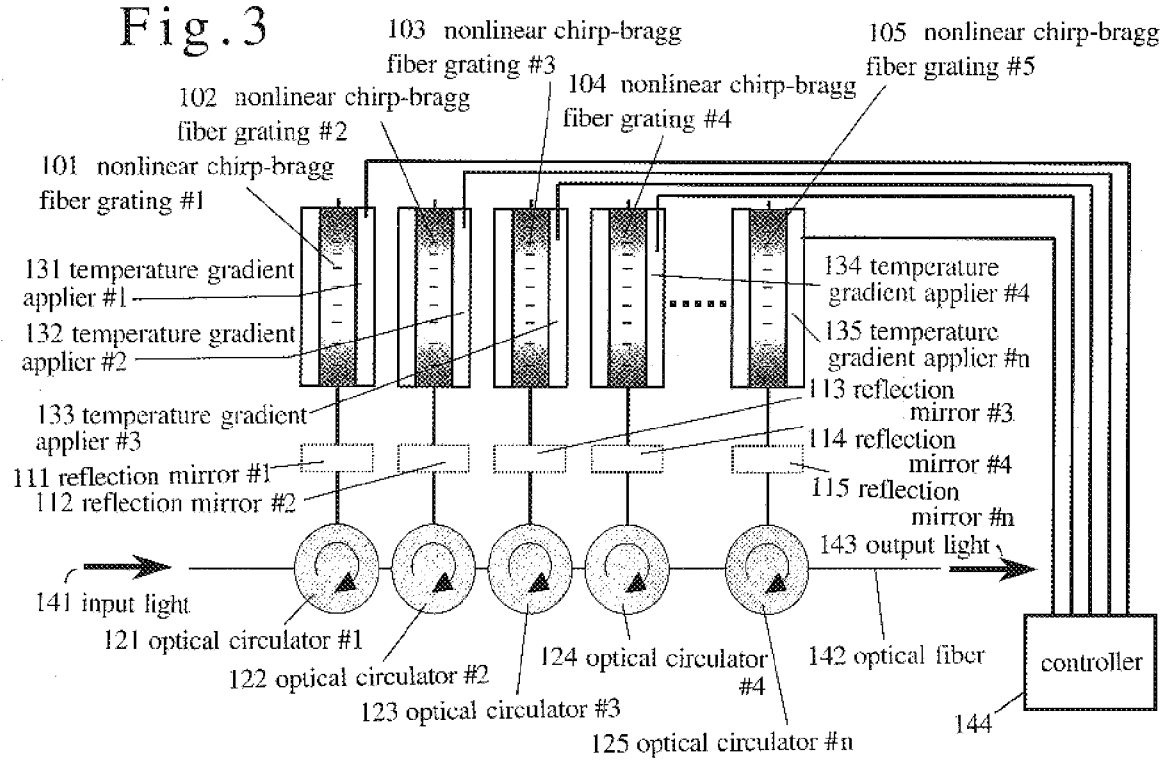
FIG. 3 is a schematic diagram showing the adaptive dispersion compensation device based on an embodiment of this invention.

Embodiment 1:

The first embodiment of this invention will be explained with reference to FIG. 3 through FIG. 7. FIG. 3 shows by block diagram the overall arrangement of the adaptive dispersion compensation device, and FIG. 4 is a perspective view of the internal structure of the device.

Figure 4:
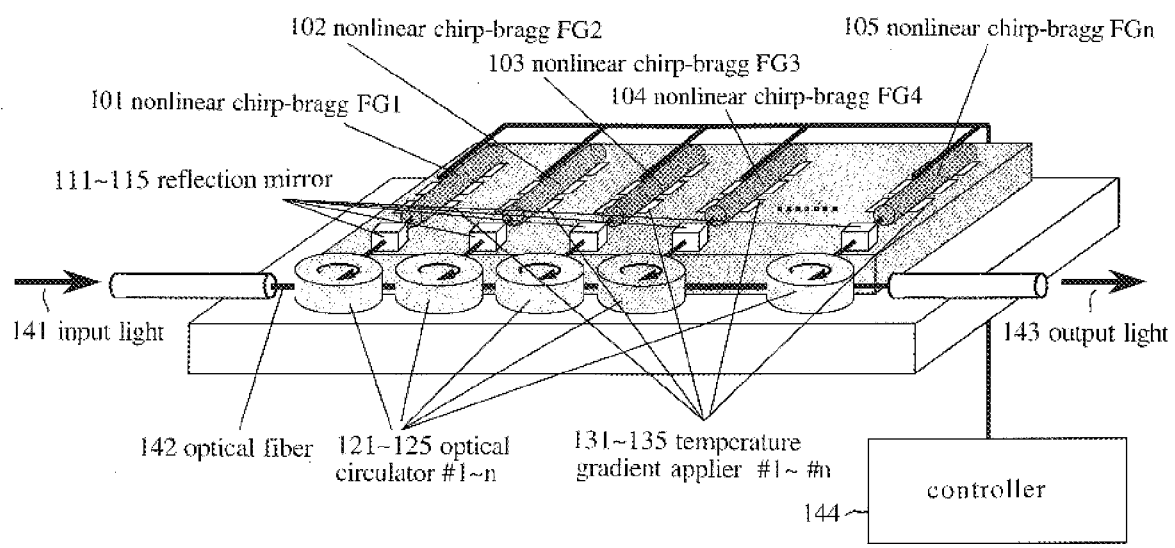
FIG. 4 is a perspective view of the internal structure of the adaptive dispersion compensation device of this embodiment.
Figure 5:
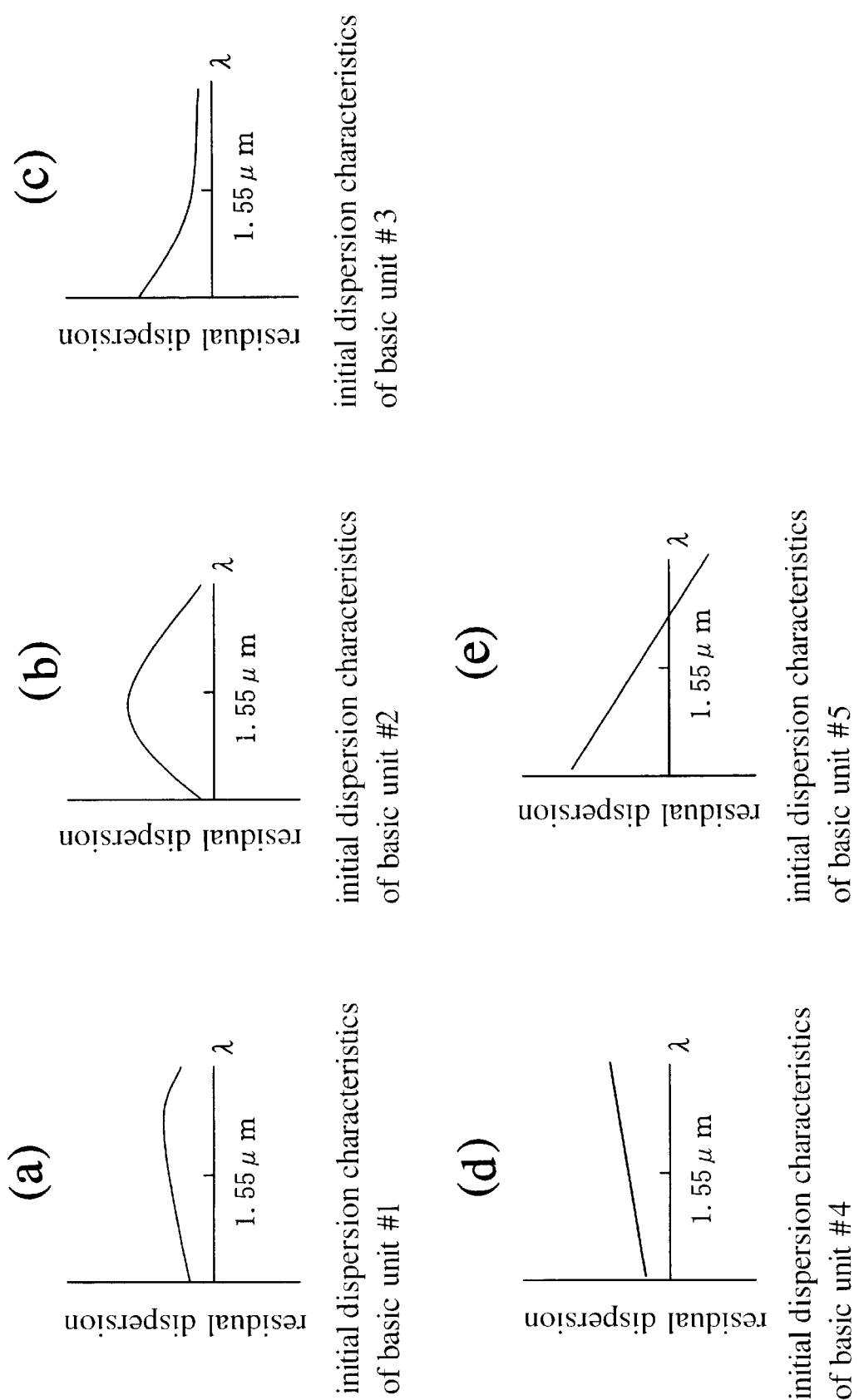
FIG. 5 is a set of graphs showing the initial residual dispersion characteristics of the basic units of this embodiment.

The device includes nonlinear chirp-bragg fiber gratings #1 through #n, indicated by 101 through 105 in FIG. 3 and FIG. 4. These nonlinear chirp-bragg fiber gratings #1-#n are provided correspondingly with reflection mirrors #1 through #n indicated by 111 through 115, optical circulators #1 through #n indicated by 121 through 125, and temperature gradient appliers #1 through #n indicated by 131 through 135, respectively. Each set of a nonlinear chirp-bragg fiber grating, reflection mirror, optical circulator and temperature gradient applier constitutes a basic unit.

The first optical circulator #1 has an input light 141. The last optical circulator #n has its output port connected with an optical fiber 142 which releases an output light 143. A controller 144 controls the operation of the nonlinear chirp-bragg fiber gratings #1-#n.

The operation of this adaptive dispersion compensation device is as follows. The input light 141 goes through the optical circulator #1 of the first basic unit, and then enters the first nonlinear chirp-bragg fiber grating #1. The light is reflected by the grating #1 by being compensated in terms of its dispersion value in accordance with the dispersion characteristics of the grating. The compensated light returns to the optical circulator #1, and enters the optical circulator #2 of the second basic unit.

Each reflection mirror is detachable. When a mirror of 100% reflectivity is placed, the input light is reflected completely by the mirror instead of reaching the grating, and accordingly this basic unit does not vary the dispersion quality of input light. When a mirror of a certain reflectivity is placed, a light component reflected by the mirror and another light component reflected by the grating merge and effectuate the compensation of the transmission line having intricate dispersion characteristics. When a reflection mirror is not placed, the optical circulator is connected directly to the nonlinear chirp-bragg fiber grating by an optical fiber with optical connectors.

The light coming out of the first basic unit goes subsequently through the second, third and n-th basic units, and eventually goes through the optical fiber 142 to become an output light 143. The controller 144 is connected to the temperature gradient appliers #1-#n to control the dispersion characteristics of the nonlinear chirp-bragg fiber gratings #1-#n based on the application of temperature gradients along the axes of the gratings.

FIGS. 5(a)–(e) show by graph the initial residual dispersion characteristics of the basic units. In these figures, FIG. 5(a) shows by graph the initial residual dispersion characteristics of the basic unit #1. FIG. 5(b) shows by graph the initial residual dispersion characteristics of the basic unit #2. FIG. 5(c) shows by graph the initial residual dispersion characteristics of the basic unit #3. FIG. 5(d) shows by graph the initial residual dispersion characteristics of the basic unit #4. And further, FIG. 5(e) shows by graph the initial residual dispersion characteristics of the basic unit #5. FIGS. 6(a) and (b) show by graph the residual dispersion values at the light input position and light output position of the transmission line. In these figures, FIG. 6(a) shows by graph the residual dispersion values at the light input position of the transmission line. And further, FIG. 6(b) shows by graph the residual dispersion values at the light output position of the transmission line. FIGS. 7(a) and (b) show the pulse widths of the input light and output light, respectively.

Each basic unit has its initial dispersion characteristics given in terms of characteristics of nonlinear chirp-bragg fiber grating. Individual nonlinear chirp-bragg fiber gratings can have different initial dispersion characteristics, which are varied by heat application, thereby determining the dispersion characteristics of the whole device.

The residual dispersion value at the light input position of the transmission line indicates the dispersion characteristics of the transmission line to be compensated by the adaptive dispersion compensation device, and the residual dispersion value at the light output position of the transmission line indicates the dispersion value after compensation. The input light pulse which has widened due to the dispersion on the transmission line undergoes the compensation of residual dispersion, and becomes the output light pulse having a narrowed pulse width.

According to this embodiment, there is accomplished an adaptive dispersion compensation device which performs the dispersion control, inclusive of the dispersion compensation and waveform shaping, for the optical fiber transmission stably and dynamically in response to the state of transmission line.

It is obvious in this embodiment that structural parameters such as the number of nonlinear chirp-bragg fiber gratings or the number of temperature gradient appliers can be determined arbitrarily depending on the bandwidth and dispersion quality of the optical fiber transmission line to be compensated. It is also obvious that the nonlinear chirp-bragg fiber gratings used in this embodiment can be replaced with linear chirp-bragg fiber gratings when necessary.

Figure 8:
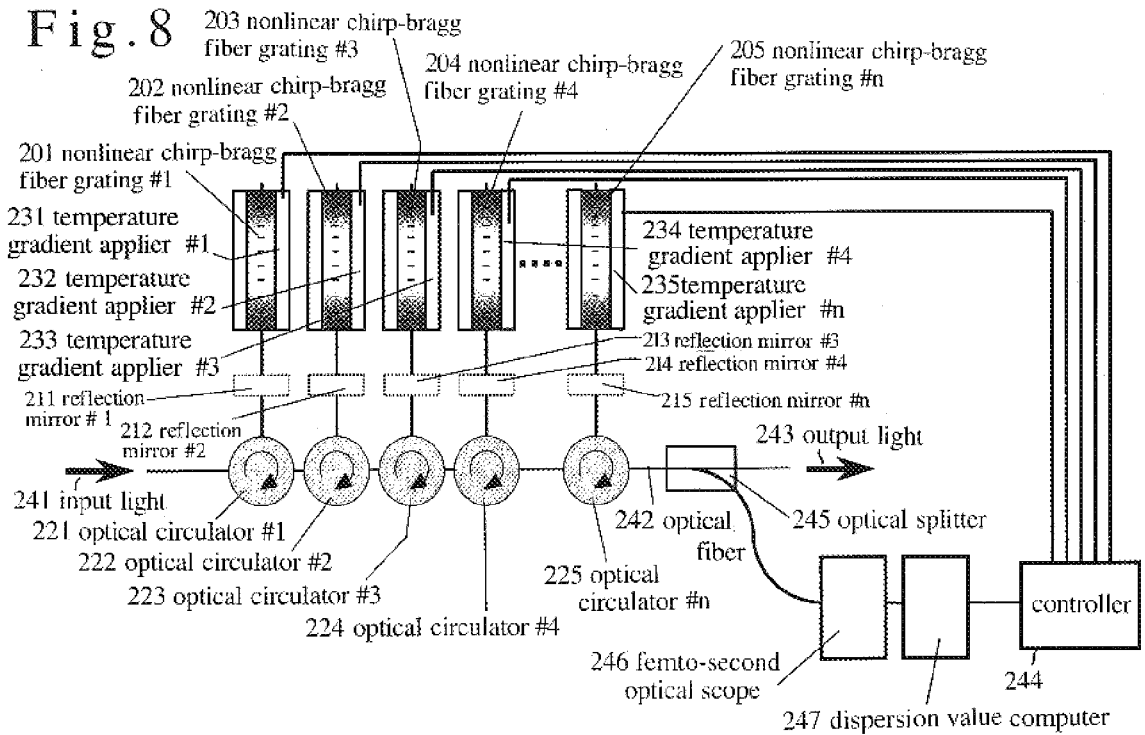
FIG. 8 and FIG. 9 are schematic diagrams used to explain the adaptive dispersion compensation devices and their control manners based on other embodiments of this invention.

Embodiment 2:

The second embodiment of this invention will be explained with reference to FIG. 8. The figure shows by block diagram the arrangement of the adaptive dispersion compensation device and the control manner of the device.

The device includes nonlinear chirp-bragg fiber gratings #1 through #n indicated by 201 through 205 in the figure, reflection mirrors #1 through #n indicated by 211 through 215, optical circulators #1 through #n indicated by 221 through 225, and temperature gradient appliers #1 through #n indicated by 231 through 235. Each set of a nonlinear chirp-bragg fiber grating, reflection mirror, optical circulator and temperature gradient applier constitutes a basic unit.

The first optical circulator #1 has an input light 241. The last optical circulator #n has its output port connected with an optical fiber 242.

The device further includes a controller 244, an optical splitter 245 which splits the light coming out of the last basic unit into two parts for release and detection, a femto-second optical scope 246 which detects a super-high speed light pulse of the order of femto seconds, and a computer 247 which computes the high-order dispersion values from the detected waveform.

The operation of this adaptive dispersion compensation device is as follows. The input light 241 goes through the optical circulator #1 of the first basic unit, and then enters the first nonlinear chirp-bragg fiber grating #1. The light is reflected by the grating #1 by being compensated in terms of its dispersion value in accordance with the dispersion characteristics of the grating. The compensated light returns to the optical circulator #1, and enters the optical circulator #2 of the second basic unit.

Each reflection mirror is detachable. When a mirror of 100% reflectivity is placed, the input light is reflected completely by the mirror instead of reaching the grating, and accordingly this basic unit does not vary the dispersion quality of input light. When a mirror of a certain reflectivity is placed, a light component reflected by the mirror and another light component reflected by the grating merge and effectuate the compensation of the transmission line having intricate dispersion characteristics. When a reflection mirror is not placed, the optical circulator is connected directly to the nonlinear chirp-bragg fiber grating by an optical fiber with optical connectors.

The light coming out of the first basic unit goes subsequently through the second, third and n-th basic units, and eventually goes through the optical fiber 242 into the optical splitter 245. One part of light coming out of the optical splitter 245 becomes the output light 243. Another part of light enters the femto-second optical scope 246, which measures the time dependency and wavelength dependency of the phase of light to make a two-dimensional map between the wavelength and delay time. The measured data are put into the computer 247, which implements the curve fitting process and the like to compute the dispersion values of the second order, third order, fourth order, and so on.

The controller 244 is connected to the temperature gradient appliers #1-#n to control the dispersion characteristics of the nonlinear chirp-bragg fiber gratings #1-#n based on the application of temperature gradients along the axes of the gratings, while being controlled based on the high-order dispersion values computed by the computer 247.

The operation of this adaptive dispersion compensation device is basically the same as the first embodiment, and in addition it is controlled based on the dispersion values computed from the wavelength and delay time measured by the femto-second optical scope, whereby it is capable of performing the characteristic analysis of super-high speed light pulses of the order of femto seconds and the dispersion control of the optical fiber transmission line based on the result of analysis.

According to this embodiment, there is accomplished an adaptive dispersion compensation device which performs the dispersion control for the optical fiber transmission fast, stably and dynamically in response to the state of transmission line based on the feedback control by use of the femto-second optical scope.

It is obvious in this embodiment that structural parameters such as the number of nonlinear chirp-bragg fiber gratings or the number of temperature gradient appliers can be determined arbitrarily depending on the bandwidth and dispersion quality of the optical fiber transmission line to be compensated. It is also obvious that the nonlinear chirp-bragg fiber gratings used in this embodiment can be replaced with linear chirp-bragg fiber gratings when necessary.

Figure 9:
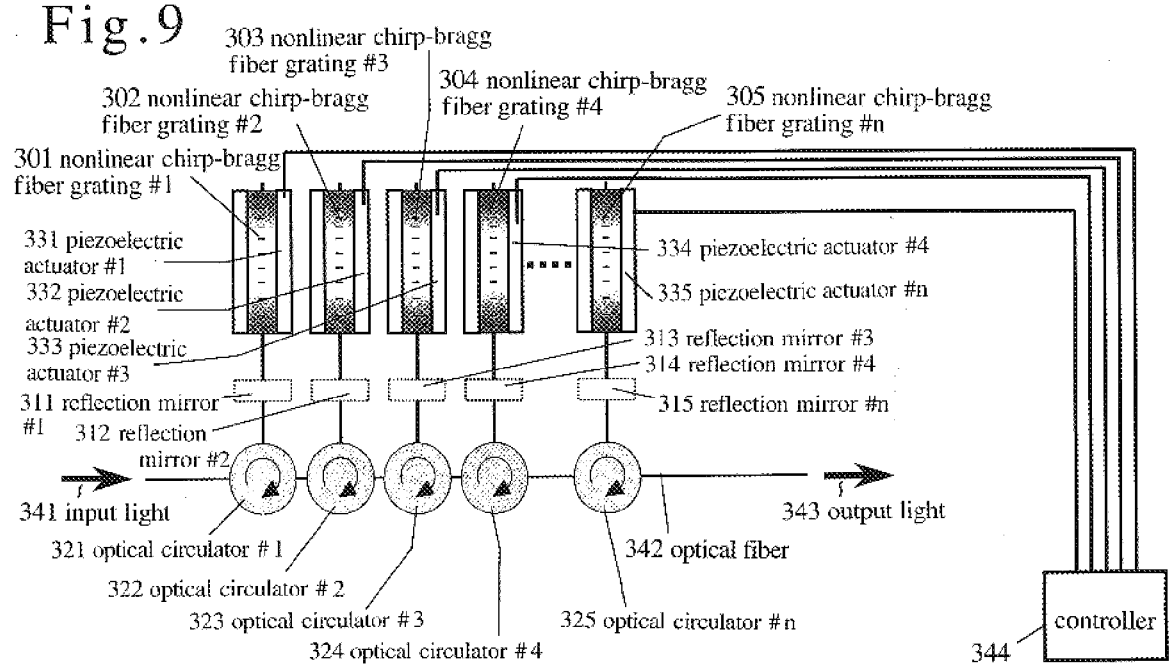

Embodiment 3:

The third embodiment of this invention will be explained with reference to FIG. 9. The figure shows by block diagram the arrangement of the adaptive dispersion compensation device and the control manner of the device.

The device includes nonlinear chirp-bragg fiber gratings #1 through #n indicated by 301 through 305 in the figure, reflection mirrors #1 through #n indicated by 311 through 315, optical circulators #1 through #n indicated by 321 through 325, and piezoelectric actuators #1 through #n indicated by 331 through 335. Each set of a nonlinear chirp-bragg fiber grating, reflection mirror, optical circulator, and piezoelectric actuator constitutes a basic unit.

The first optical circulator #1 has an input light 341, and the last optical circulator #n has its output port connected with an optical fiber 342 which releases an output light 343. The device further includes a controller 344.

The operation of this adaptive dispersion compensation device is as follows. The input light 341 goes through the optical circulator #1 of the first basic unit, and then enters the first nonlinear chirp-bragg fiber grating #1. The light is reflected by the grating #1 by being compensated in terms of its dispersion value in accordance with the dispersion characteristics of the grating. The compensated light returns to the optical circulator #1, and enters the optical circulator #2 of the second basic unit.

Each reflection mirror is detachable. When a mirror of 100% reflectivity is placed, the input light is reflected completely by the mirror instead of reaching the grating, and accordingly this basic unit does not vary the dispersion quality of input light. When a mirror of a certain reflectivity is placed, a light component reflected by the mirror and another light component reflected by the grating merge and effectuate the compensation of the transmission line having intricate dispersion characteristics. When a reflection mirror is not placed, the optical circulator is connected directly to the nonlinear chirp-bragg fiber grating by an optical fiber with optical connectors.

The light coming out of the first basic unit goes subsequently through the second, third and n-th basic units, and eventually goes through the optical fiber 342 to become an output light 343. The controller 344 is connected to the piezoelectric actuators #1-#n. Each piezoelectric actuator applies a tension to the nonlinear chirp-bragg fiber grating along its axis thereby to vary the length so that the dispersion characteristics shift in the direction of wavelength and the reflection center wavelength varies.

The operation of this adaptive dispersion compensation device is basically the same as the first embodiment, and in addition it varies the characteristics of individual nonlinear chirp-bragg fiber gratings from their initial states based on the application of tensions with the piezoelectric actuators, whereby it is possible to vary the dispersion characteristics as the whole.

According to this embodiment, there is accomplished an adaptive dispersion compensation device which performs the dispersion control, inclusive of the dispersion compensation and waveform shaping, for the optical fiber transmission stably and dynamically in response to the state of transmission line.

It is obvious in this embodiment that structural parameters such as the number of nonlinear chirp-bragg fiber gratings or the number of piezoelectric actuators and the amount of shift of dispersion characteristics made by each piezoelectric actuator can be determined arbitrarily depending on the bandwidth and dispersion quality of the optical fiber transmission line to be compensated. It is also obvious that the nonlinear chirp-bragg fiber gratings used in this embodiment can be replaced with linear chirp-bragg fiber gratings when necessary.

As described above, the inventive adaptive dispersion compensation device is arranged to include a plurality of basic units each including a chirp-bragg fiber grating which is formed in an optical waveguide, a reflection mirror which is disposed on the light input side of the chirp-bragg fiber grating by being detachable and an optical circulator which is connected to the reflection mirror, means of connecting the basic units in series, and means of controlling the dispersion characteristics of each chirp-bragg fiber grating by applying a temperature gradient to it along its axis, whereby the compact device is capable of performing the dispersion control, inclusive of the dispersion compensation and waveform shaping, for the optical fiber transmission stably in adaptive fashion.

The inventive adaptive dispersion compensation device is arranged to further include a femto-second optical scope which detects the nature of the output signal light and means of controlling the dispersion characteristics of each basic unit in feedback fashion based on the dispersion value computed from the detected nature of the output signal light, whereby it is capable of performing the dispersion control, inclusive of the dispersion compensation and waveform shaping, for the optical fiber transmission in adaptive fashion while monitoring the light signal on the optical fiber transmission line.

While the present invention has been described for the illustrated preferred embodiments, it will be obvious to those skilled in the art that various alterations and modifications may be made without departing from the essence of the invention. It is therefore intended to cover all such variations as fall within the scope of the present invention.

What is claimed is:

1. An adaptive dispersion compensation device comprising:

a plurality of basic units each including a chirp-bragg fiber grating which is formed in an optical waveguide, a reflection mirror which is disposed on the light input side of said chirp-bragg fiber grating by being detachable and an optical circulator which is connected to said reflection mirror; means of connecting said basic units in series; and means of controlling the dispersion characteristics of said chirp-bragg fiber gratings by applying temperature gradients thereto along the axes thereof.

2. An adaptive dispersion compensation device according to claim 1 further including a femto-second optical scope which detects the nature of the output signal light; and means of controlling the dispersion characteristics of said basic units in feedback fashion based on the dispersion value computed from the detected nature of the output signal light.

3. An adaptive dispersion compensation device according to claim 2 further including means of controlling the dispersion characteristics of said basic units in feedback fashion based on the dispersion value of the third order or higher computed from the detected nature of the output signal light.

4. An adaptive dispersion compensation device according to claim 1 further including means of controlling the dispersion characteristics of said chirp-bragg fiber gratings by applying tensions thereto along the axes thereof.

5. A method of controlling an adaptive dispersion compensation device comprising the operational steps of:

entering a control signal for setting temperature gradients of chirp-bragg fiber gratings to a dispersion characteristic control means;

applying temperature gradients, which are produced by said dispersion characteristic control means in accordance with the control signal, to said chirp-bragg fiber gratings along the axes thereof; and controlling the dispersion quality of the input light with the chirp-bragg fiber gratings having the application of the temperature gradients.

* * * * *